United States Patent
Moritz et al.

(10) Patent No.: US 11,027,523 B2
(45) Date of Patent: Jun. 8, 2021

(54) POLYESTER FILM INCORPORATING SILICONE FOR RELEASE OF CANNED MEAT PRODUCTS

(71) Applicant: TORAY PLASTICS (AMERICA), INC., North Kingstown, RI (US)

(72) Inventors: Jan Moritz, Bristol, RI (US); Pat Andrews, West Kingstown, RI (US); Keunsuk P. Chang, North Kingstown, RI (US); Christopher Nothnagle, Saunderstown, RI (US); Stefanos Sakellarides, East Greenwich, RI (US)

(73) Assignee: TORAY PLASTICS (AMERICA), INC., North Kingstown, RI (US)

( * ) Notice: Subject to any disclaimer, the term of this patent is extended or adjusted under 35 U.S.C. 154(b) by 0 days.

(21) Appl. No.: 15/663,142

(22) Filed: Jul. 28, 2017

(65) Prior Publication Data

US 2017/0326842 A1    Nov. 16, 2017

Related U.S. Application Data

(63) Continuation-in-part of application No. 14/954,390, filed on Nov. 30, 2015, now abandoned.

(51) Int. Cl.
*B32B 15/09* (2006.01)
*C08J 5/18* (2006.01)
(Continued)

(52) U.S. Cl.
CPC ........... *B32B 15/09* (2013.01); *B32B 1/02* (2013.01); *B32B 7/04* (2013.01); *B32B 7/12* (2013.01);
(Continued)

(58) Field of Classification Search
None
See application file for complete search history.

(56) References Cited

U.S. PATENT DOCUMENTS 4,143,790 A * 3/1979 Ueno .................... B65D 25/14
220/604
4,761,327 A * 8/1988 Hamano ............ B29C 47/0004
428/220

(Continued)

FOREIGN PATENT DOCUMENTS

| GB | 2 055 687 A | * | 3/1981 |
| WO | WO 95/08442 A | * | 3/1995 |
| WO | 2015/114113 | | 8/2015 |

OTHER PUBLICATIONS

Shearer, G., "Silicones in Plastics Industry", Inorganic Polymers, Article 15, Nova Science Publishers (+citation) (8 pages) (published 2009). (Year: 2009).*

(Continued)

*Primary Examiner* — Vivian Chen
(74) *Attorney, Agent, or Firm* — Dave Law Group LLC; Raj S. Dave

(57) ABSTRACT

Embodiments herein relates to a Bisphenol A-free multi-layer biaxially oriented polyester (BOPET) film, for lamination on metal sheets, which could be used for food containers. The BOPET film has at least one outer release layer, which aids in the release of food, such as a high protein food source, when food is cooked and sterilized in direct contact with the outer release layer. The BOPET film can be laminated to metals used in the manufacture of food containers with the outer release layer being exposed to allow a direct food contact between the surface of the outer release layer and food. More particularly, the invention relates to a novel outer release layer resin composition comprising an ultra high molecular weight siloxane polymer (Continued)

and a polyethylene trephthalate resin; and an alkali-metal phosphate and a phosphoric acid compound added, during polymerization of the outer release layer resin composition, as a catalyst/additive package to the ingredients forming the outer release layer resin composition. A wax component can be added in the outer release layer, for more robust release performance.

8 Claims, 6 Drawing Sheets
(6 of 6 Drawing Sheet(s) Filed in Color)

(51) Int. Cl.
| | | |
|---|---|---|
| B32B 15/18 | (2006.01) | |
| B32B 7/12 | (2006.01) | |
| B65D 25/14 | (2006.01) | |
| B65D 81/24 | (2006.01) | |
| B65D 81/34 | (2006.01) | |
| C08L 67/02 | (2006.01) | |
| B32B 27/18 | (2006.01) | |
| B32B 27/36 | (2006.01) | |
| B32B 27/08 | (2006.01) | |
| B32B 7/04 | (2019.01) | |
| B32B 27/28 | (2006.01) | |
| B32B 1/02 | (2006.01) | |
| B32B 15/20 | (2006.01) | |
| C08L 67/03 | (2006.01) | |
| C08L 83/04 | (2006.01) | |
| C08K 3/32 | (2006.01) | |
| C08K 3/36 | (2006.01) | |

(52) U.S. Cl.
CPC ............. *B32B 15/18* (2013.01); *B32B 15/20* (2013.01); *B32B 27/08* (2013.01); *B32B 27/18* (2013.01); *B32B 27/283* (2013.01); *B32B 27/36* (2013.01); *B65D 25/14* (2013.01); *B65D 81/24* (2013.01); *B65D 81/3415* (2013.01); *C08J 5/18* (2013.01); *C08L 67/02* (2013.01); *B32B 2250/02* (2013.01); *B32B 2250/03* (2013.01); *B32B 2250/04* (2013.01); *B32B 2250/244* (2013.01); *B32B 2264/02* (2013.01); *B32B 2264/102* (2013.01); *B32B 2264/1021* (2020.08); *B32B 2270/00* (2013.01); *B32B 2307/306* (2013.01); *B32B 2307/308* (2013.01); *B32B 2307/31* (2013.01); *B32B 2307/518* (2013.01); *B32B 2307/70* (2013.01); *B32B 2307/702* (2013.01); *B32B 2307/714* (2013.01); *B32B 2307/73* (2013.01); *B32B 2307/732* (2013.01); *B32B 2307/746* (2013.01); *B32B 2307/748* (2013.01); *B32B 2311/00* (2013.01); *B32B 2311/30* (2013.01); *B32B 2367/00* (2013.01); *B32B 2439/66* (2013.01); *B32B 2439/70* (2013.01); *B65D 81/34* (2013.01); *C08J 2367/02* (2013.01); *C08J 2483/04* (2013.01); *C08K 3/32* (2013.01); *C08K 3/36* (2013.01); *C08K 2003/321* (2013.01); *C08K 2003/324* (2013.01); *C08K 2003/329* (2013.01); *C08L 67/03* (2013.01); *C08L 83/04* (2013.01); *C08L 2203/16* (2013.01); *C08L 2205/02* (2013.01); *C08L 2205/025* (2013.01); *Y10T 428/31681* (2015.04); *Y10T 428/31786* (2015.04)

(56) References Cited

U.S. PATENT DOCUMENTS

| | | | | |
|---|---|---|---|---|
| 4,957,820 | A * | 9/1990 | Heyes | B32B 15/08 428/623 |
| 5,093,208 | A * | 3/1992 | Heyes | B32B 15/08 428/623 |
| 5,149,389 | A * | 9/1992 | Heyes | B32B 15/08 156/272.4 |
| 5,384,354 | A * | 1/1995 | Hasegawa | B29C 55/12 524/539 |
| 5,480,715 | A * | 1/1996 | Mills | B32B 27/36 428/327 |
| 5,585,177 | A * | 12/1996 | Okamura | B32B 15/08 428/341 |
| 5,618,621 | A * | 4/1997 | Hasegawa | B32B 27/36 428/343 |
| 5,753,328 | A * | 5/1998 | Miyazawa | B32B 15/08 428/35.8 |
| 5,759,651 | A * | 6/1998 | Machii | B65D 1/28 220/62.22 |
| 5,900,325 | A * | 5/1999 | Okamura | B32B 15/08 428/623 |
| 6,261,654 | B1 * | 7/2001 | Maita | B32B 15/08 428/35.9 |
| 6,365,659 | B1 * | 4/2002 | Aoyama | B32B 27/12 524/399 |
| 6,652,979 | B1 * | 11/2003 | Takahashi | B32B 15/08 428/458 |
| 6,905,774 | B2 * | 6/2005 | Takahashi | B32B 15/08 428/458 |
| 7,198,856 | B2 * | 4/2007 | Yamanaka | B32B 15/08 428/458 |
| 7,435,465 | B2 * | 10/2008 | Yamanaka | B32B 15/08 428/35.9 |
| 2003/0069387 | A1 * | 4/2003 | Majima | B32B 15/08 528/271 |
| 2003/0087980 | A1 * | 5/2003 | Moriga | B65D 53/00 521/155 |
| 2003/0207038 | A1 * | 11/2003 | Han | C09D 103/04 427/384 |
| 2004/0115424 | A1 * | 6/2004 | Cowton | C08J 7/047 428/327 |
| 2004/0151934 | A1 * | 8/2004 | Schwark | B32B 27/18 428/518 |
| 2004/0219316 | A1 * | 11/2004 | Takahashi | B32B 15/08 428/35.7 |
| 2005/0191483 | A1 * | 9/2005 | Yoshida | B32B 15/08 428/332 |
| 2005/0260417 | A1 * | 11/2005 | Yamanaka | B32B 15/08 428/425.8 |
| 2007/0031688 | A1 * | 2/2007 | Suzuki | B32B 15/08 428/458 |
| 2007/0092742 | A1 * | 4/2007 | Spaans | B32B 15/08 428/458 |
| 2007/0111133 | A1 * | 5/2007 | Foster | B41M 5/41 430/200 |
| 2008/0261063 | A1 * | 10/2008 | Yamanaka | B32B 15/08 428/483 |
| 2009/0068481 | A1 * | 3/2009 | Yamanaka | B32B 15/08 428/458 |
| 2010/0310824 | A1 * | 12/2010 | Oshima | B32B 27/36 428/141 |
| 2011/0216474 | A1 * | 9/2011 | Grosrenaud | C08J 5/18 361/323 |
| 2011/0274922 | A1 * | 11/2011 | Yasue | B32B 7/12 428/354 |
| 2011/0293957 | A1 * | 12/2011 | Johansson | C08L 3/02 428/533 |
| 2011/0313102 | A1 * | 12/2011 | Kojima | C08G 63/87 524/706 |
| 2013/0011631 | A1 * | 1/2013 | Sakellarides | B32B 27/06 428/195.1 |
| 2013/0209756 | A1 * | 8/2013 | Squier | B32B 27/18 428/195.1 |

(56) References Cited

U.S. PATENT DOCUMENTS

| | | | | |
|---|---|---|---|---|
| 2014/0339123 | A1* | 11/2014 | Nakagawa | B32B 15/09 |
| | | | | 206/524.2 |
| 2016/0183544 | A1* | 6/2016 | Fitch | A23B 4/32 |
| | | | | 428/481 |
| 2016/0355294 | A1* | 12/2016 | Yamanaka | B05D 7/14 |
| 2017/0008256 | A1* | 1/2017 | Yamanaka | B05D 7/14 |
| 2017/0012151 | A1* | 1/2017 | Lacrampe | B32B 27/08 |
| 2017/0152075 | A1* | 6/2017 | Moritz | B32B 7/12 |
| 2017/0152356 | A1* | 6/2017 | Moritz | C08L 67/02 |
| 2017/0326842 | A1* | 11/2017 | Moritz | B32B 15/09 |

OTHER PUBLICATIONS

Ryan, K. et al., "Ultra High Molecular Weight Functional Silixone Additives in Polymers: Effects on Processing and Properties." Dow Corning. (2001). (Year: 2001).*

Scheirs, J., "Additives for the Modification of Poly(Ethylene Terephthalate) to Produce Engineering-Grade Polymers." Modern Polyesters: Chemistry and Technology of Polyesters and Copolyesters. (2003) (Year: 2003).*

Shearer, G., "Silicones in Plastics Industry", Inorganic Polymers, Chapter 2, Article 15, Nova Science Publishers (6 pages), (2009).

International Search Report and Written Opinion dated Feb. 10, 2017 in corresponding International Patent Application No. PCT/IB2016/057228.

International Search Report and Written Opinion dated May 15, 2017 in corresponding International Patent Application No. PCT/IB2017/051182.

* cited by examiner

POLYESTER FILM INCORPORATING SILICONE FOR RELEASE OF CANNED MEAT PRODUCTS

RELATED APPLICATIONS

This present application is a continuation-in-part of U.S. patent application Ser. No. 14/954,390 filed on Nov. 30, 2015, abandoned the entire content of which is hereby incorporated herein by reference in its entirety.

FIELD OF THE INVENTION

This invention relates to Bisphenol A ("BPA") free multi-layer film, such as a biaxially oriented polyester (BOPET) film, for lamination on metal sheets, which could be used for food containers. More particularly, the multi-layer film has an outer release layer, which aids in the release of food, such as a high protein food source, when food is cooked and sterilized in direct contact with the outer release layer.

BACKGROUND OF THE INVENTION

Principles of Food Canning

Unlike pasteurized "cooked" meat products where the survival of heat resistant microorganisms is accepted, the aim of sterilization of meat products is the destruction of all contaminating bacteria including their spores. Heat treatment of such products may be intensive enough to inactivate/kill the most heat-resistant bacterial microorganisms, which are the spores of *Bacillus* and *Clostridium*. In practice, the meat products filled in sealed containers are exposed to temperatures above 100° C. in pressure cookers. Temperatures above 100° C., usually ranging from 110-130° C. depending on the type of product, may be reached inside the product. Products are kept for a defined period of time at temperature levels required for the sterilization depending on type of product and size of container.

If spores are not completely inactivated in canned goods, vegetative microorganisms will grow from the spores as soon as conditions are favourable again. In the case of heat-treated processed meat, favourable conditions will exist when the heat treatment is completed and the products are stored under ambient temperatures. The surviving microorganisms can either spoil preserved meat products or produce toxins which cause food poisoning of consumers, Amongst the two groups of spore-producing microorganisms, *Clostridium* is more heat-resistant than *Bacillus*. Temperatures of 110° C. will kill most *Bacillus* spores within a short time. In the case of *Clostridium* temperatures of up to 121° C. are needed to kill the spores within a relatively short time.

The above sterilization temperatures are needed for short-term inactivation (within a few seconds) of spores of *Bacillus* or *Clostridium*. These spores can also be killed at slightly lower temperatures, but longer heat treatment periods may be applied in such cases to arrive at the same level of heat treatment.

From the microbial point of view, it would be ideal to employ very intensive heat treatment which would eliminate the risk of any surviving microorganisms. However, most canned meat products cannot be submitted to such intensive heat stress without suffering degradation of their sensory quality such as very soft texture, jelly and fat separation, discoloration, undesirable heat treatment taste and loss of nutritional value (destruction of vitamins and protein components).

In order to comply with the above aspects, a compromise has to be reached in order to keep the heat sterilization intensive enough for the microbiological safety of the products and as moderate as possible for product quality reasons.

Meat Products Suitable for Canning

Practically all processed meat products which require heat treatment during preparation for consumption are suitable for heat preservation. Meat products which do not receive any form of heat treatment before being consumed, such as dried meat, raw hams or dry sausages, are naturally not suitable for canning as they are preserved by low pH and/or low water activity.

The following, though not limiting, groups of meat products are frequently manufactured as canned products: cooked hams or pork shoulders; sausages with brine of the frankfurter type; sausage mix of the bologna or liver sausage type; meat preparations such as corned beef, chopped pork; and ready-to-eat dishes with meat ingredients such as beef in gravy, chicken with rice, soups with meat ingredients such as chicken soup or oxtail soup.

Can Linings

Metal food and beverage containers, e.g., cans, are lined with a coating on the interior surface. This coating is essential to prevent corrosion of the container and contamination of food and beverages with dissolved metals. In addition, the coating helps to prevent canned foods from becoming tainted or spoiled by bacterial contamination. The major types of interior coatings for food containers are made from epoxy resins, which have achieved wide acceptance for use as protective coatings because of their exceptional combination of toughness, adhesion, formability and chemical resistance. Such coatings are essentially inert and have been used for over 40 years. In addition to protecting contents from spoilage, these coatings make it possible for food products to maintain their quality and taste, while extending shelf life.

However, these epoxy polymers may contain a residual amount of a chemical building block called BPA, which has faced much scrutiny from consumer advocacy groups. Under Proposition 65, California has proposed for the second time to list BPA as a cause of reproductive toxicity. Thus, there is a desire to eliminate BPA-based epoxy resins as protective coatings.

In the past decade, consumers and health experts have raised concerns about the use of BPA in food packaging. The molecule has a shape similar to estrogens and thus may act as an endocrine disrupter.

Therefore, food companies are eager to move away from food packaging based on BPA. Coating manufacturers and their suppliers are working overtime to find a replacement for the ubiquitous epoxies, which are made by reacting BPA with epichlorohydrin. In short, there is an urgent need for a BPA-free coating for food containers. The BPA-free BOPET film of the present invention satisfies this need.

Laminating polyester films to metal prior to forming the container parts is one solution for replacing containers lined with an epoxy coating. Biaxially oriented polyethylene terephthalate (BOPET) films are used for multiple applications such as food packaging, decorative, and labels for example.

The food packaging industry uses BOPET films in many heat sealable tray applications where there might be direct contact of food to BOPET, but food release from the BOPET film surface is inadequate.

Food Release

One issue resulting from cooking & sterilization of foods inside the container, especially for foods containing a significant amount of solids such as of meat products, is adherence of solid food particles to the interior container surface, which makes discharging the entire can contents problematic. Various methods have been proposed in the patent literature to address this phenomenon, which include incorporating a wax (U.S. Pat. Nos. 6,652,979, 6,905,774, 7,198,856, 7,435,465) or a silicone compound (U.S. Pat. No. 6,905,774).

SUMMARY OF THE INVENTION

An embodiment herein relates to a polyester film comprising at least one layer comprising: (a) 0.1-99.9 wt. % of a polyester resin P1 comprising an alkali metal phosphate in an amount of 1.3 mol/ton of the polyester resin P1 to 3.0 mol/ton of the polyester resin P, and phosphoric acid in an amount of from 0.4 to 1.5 times by mole that of the alkali metal phosphate; (b) 0.1-2 wt. % of a silicone resin comprising a polydiemthylsiloxane resin; (c) optionally 0.001 to 0.09 wt. % of a wax component; and wherein the polyester film is free of Bisphenol A. In one embodiment, the polyester resin P1 comprises an aromatic polyester. In one embodiment, the aromatic polyester comprises at least 50 wt. % ethylene terephthalate as a constituent component of the aromatic polyester. In one embodiment, the at least one layer comprises an outer release layer having a food area coverage of about 10% or less as measured according to Food Release Test.

In one embodiment, the film structure comprising at least an outer release layer A, further comprises a heat-sealable layer B comprising (a) 0.1-100 wt. % of a polyester resin P2, wherein the polyester resin P2 is crystallizable and different from the polyester resin P1; (b) 0.1-100 wt. % of an amorphous copolyester resin or a polyester resin having a melting point of least 20° C. below that of the polyester resin P2; and (c) 0.1-15 wt. % of an antiblock comprising organic or inorganic particles. In one embodiment, the polyester film further comprises a heat-sealable layer C having the same or substantially the same composition as that of the heat-sealable layer B. In one embodiment, the polyester film further comprises a heat-sealable layer C having a different composition from that of the heat-sealable layer B. In one embodiment, the polyester P2 comprises an aromatic polyester. In one embodiment, the polyester resin P2 comprises at least 50 wt. % ethylene terephthalate as a constituent component of the polyester resin P2. In one embodiment, component (b) of the polyester resin having a melting point of at least 20° C. below that of polyester resin P2 is essentially polybutylene terephthalate (PBT) resin.

Another embodiment is related to a laminated metal sheet comprising a polyester film of the embodiments herein. In one embodiment, the silicone resin has a kinematic viscosity ranging from $10\text{-}50 \times 10^6$ centistokes at room temperature.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
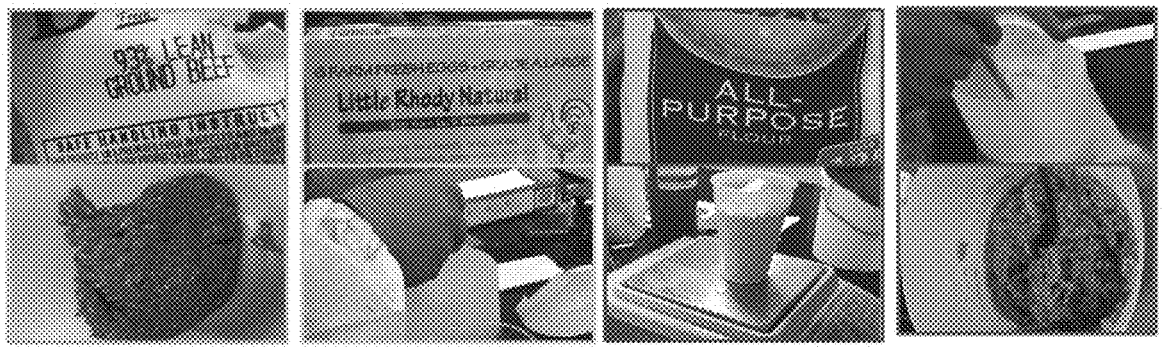
FIG. 1 shows pictures of the different ingredients used in preparing the food mix for Food Release Test.

Embodiments herein relate to a polyester film, namely a BOPET film, which has superior heat resistance to be able to withstand the temperatures associated with retort sterilization temperatures and barrier properties to provide corrosion resistance to a metal container by a food product. The BOPET film is capable of being laminated and formed to metal plates for the container forming process. Furthermore, the BOPET film is capable of providing a sufficient release surface to enable high protein food (meat products) to be easily removed from the container after high heat sterilization. Surprisingly the inventors have found that the release action imparted by incorporating silicone comprising ultra-high-molecular weight siloxane is greatly enhanced when using a polyester resin carrier formulated with an alkali metal phosphate and phosphoric acid during polymerization. The original purpose of the alkali metal phosphate/phosphoric acid package was to improve hydrolysis resistance and the added benefit of the enhancement of silicone's release action was a surprising finding.

The BOPET film may comprise one or more layers, preferably at least 2 layers. A multilayered BOPET film may include one or more of each of: a container-side or inside layer (i.e., heat seal or metal bonding layer), a food or outside layer, a food release layer. In addition there may be one or more core layers between the layer bonded to the metal surface and the food side layer that is in direct contact with the food stored inside the container.

BOPET Film

The film which can be laminated to a metal plate for canning which is typically made of tin-free steel (TFS), electro-tin-plated steel (ETP), or aluminum, said film characterized by a dimensional change of not more than 2.0% after a heat treatment of 210° C. as part of the continuous lamination process.

The films disclosed herein include two-layer or three-layer coextruded and biaxially drawn structures. The outer release layer and an optional lower "skin" layer are generally thinner than the core "main" layer. The outer release layer (thereafter referred to as "skin A"), typically contains an ultra high molecular weight silicone (based on siloxane) resin, that has been pre-blended with a copolyester elastomer resin to form a "masterbatch," which is then added at low levels in the outer release layer during coextrusion.

The term "ultra high molecular weight silicone" or "UHMW PDMS" (where PDMS stands for polydiemthylsiloxane) refers to PDMS resins, wherein the UHMW PDMS has kinematic viscosities ranging from $10\text{-}50 \times 10^6$ centistokes at room temperature. (G. Shearer; *Silicones in the Plastics Industry*, article 15 published in chapter 2: "Silicones in Industrial Applications", in Inorganic Polymers, edited by Roger de Jaeger, Nova Science Publishers, 2007). According to the above cited reference, an advantage of UHMW PDMS is that it forms stable droplet domains in various thermoplastic carriers as pellets, so as to allow easy addition of the additive directly to the thermoplastic during processing. Another advantage of UHMW PDMS is that it does not bleed-out from the BOPET while at the same time migrates to the surface of the BOPET film, thereby providing desirable release characteristics.

The typical UHMW silicone concentration in the masterbatch is 50 wt. %. Masterbatch addition levels in the outer release layer range between 0.2 and 4 wt. %, resulting in net siloxane content in the range 0.1-2%. The remaining components of the outer release layer are polyethylene terephthalate (PET) resin composition comprising an alkali metal phosphate as a phosphorus compound in an amount of 1.3 mol/ton to 3.0 mol/ton, and phosphoric acid as another phosphorus compound in an amount of 0.4 to 1.5 times (by mole) that of the alkali metal phosphate. (major component), and optionally inorganic particles for anti-blocking purposes. Typical inorganic particle compositions in this case is silica (silicon dioxide, $SiO_2$) in sizes ranging from sub-micron up to a few microns. The silica particles are typically added during coextrusion in the form of a concentrate PET chip ("silica masterchip") made by adding silica in the polymerization. Typical silica content in the silica masterchip is 1-3 wt. %; typical addition level of the silica masterchip in the outer release layer is 1-15 wt %, resulting in net silica content around 0.1-3 wt. %.

Release layer A can further contain a wax component for more robust release performance. The term "wax component" refers to a component containing a wax or wax-like material. Waxes are a diverse class of organic compounds that are hydrophobic, malleable solids near ambient temperatures. They include higher alkanes and lipids, typically with melting points above about 40° C. (104° F.), melting to give low viscosity liquids. Waxes are insoluble in water but soluble in organic, nonpolar solvents. Natural waxes of different types are produced by plants and animals and occur in petroleum (source: https://en.wikipedia.org/wiki/Wax). A "wax-like material" refers to a material that has properties of a wax but is not a wax.

The amount of wax component added is 0.001 to 0.090 wt. %. Examples of such waxes are mentioned in U.S. Pat. No. 6,905,774, incorporated herein by reference in its entirety. Specifically, examples of the wax compounds which can be used here, are the esters of aliphatic carboxylic acid compounds and aliphatic alcohol compounds, and the amides of aliphatic carboxylic acid compounds and aliphatic amine compounds, and preferably the wax is composed of a compound in which the total number of carbons is 30 to 120, and more preferably 40 to 100. As examples of such compounds, synthetic or natural waxes comprising aliphatic esters like stearyl stearate, carnauba wax, candelilla wax, rice wax, pentaerythritol full ester, behenyl behenate, palmityl myristate and stearyl triglyceride, are preferred from the point of view of compatibility with the polyester.

In particular, from the point of view of outstanding release properties following repeated use, use after fabrication and use in an aqueous environment, and from the point of view of manifesting non-adsorption properties and enhancing hygiene in food packaging applications, etc, the addition of carnauba wax is preferred and especially refined carnauba wax.

Figure 9:
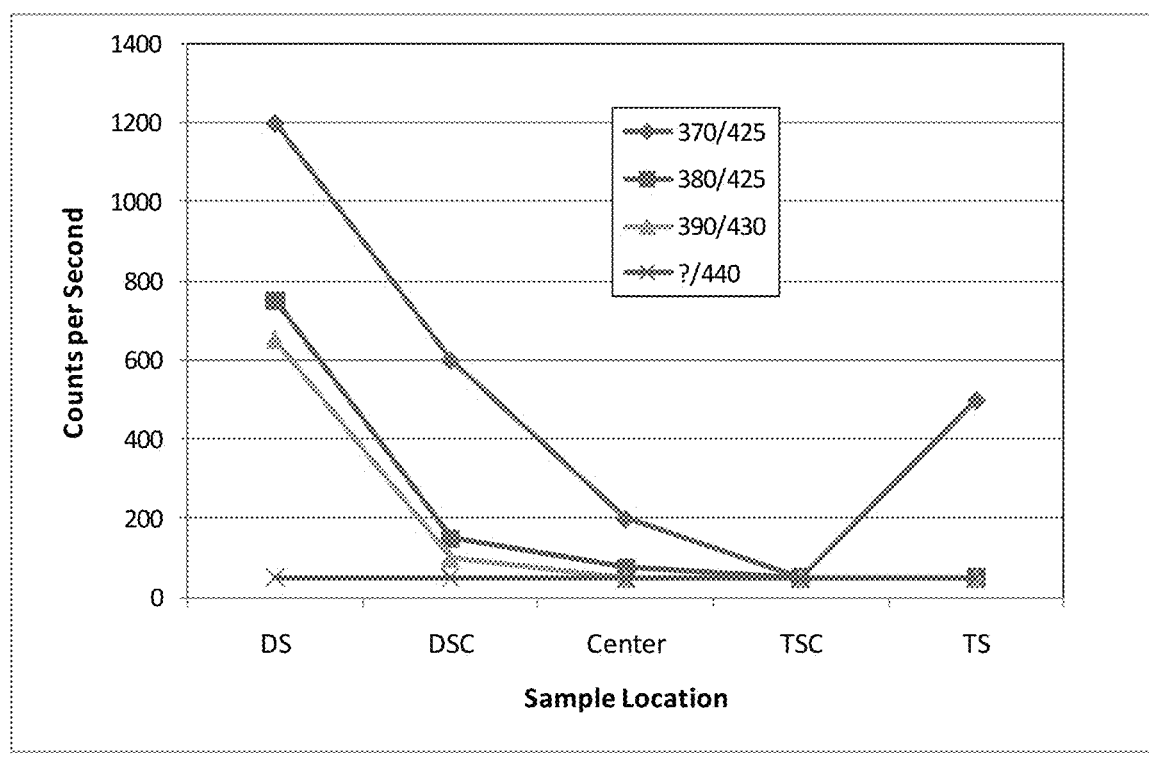
FIG. 9 shows a plot of relative crystallinity values (counts per second) determined by XRD (X-ray diffraction test) measured at different locations of the film of Comparative Example 8 after steel lamination at the indicated lamination and post-bake temperature settings.
Figure 10:
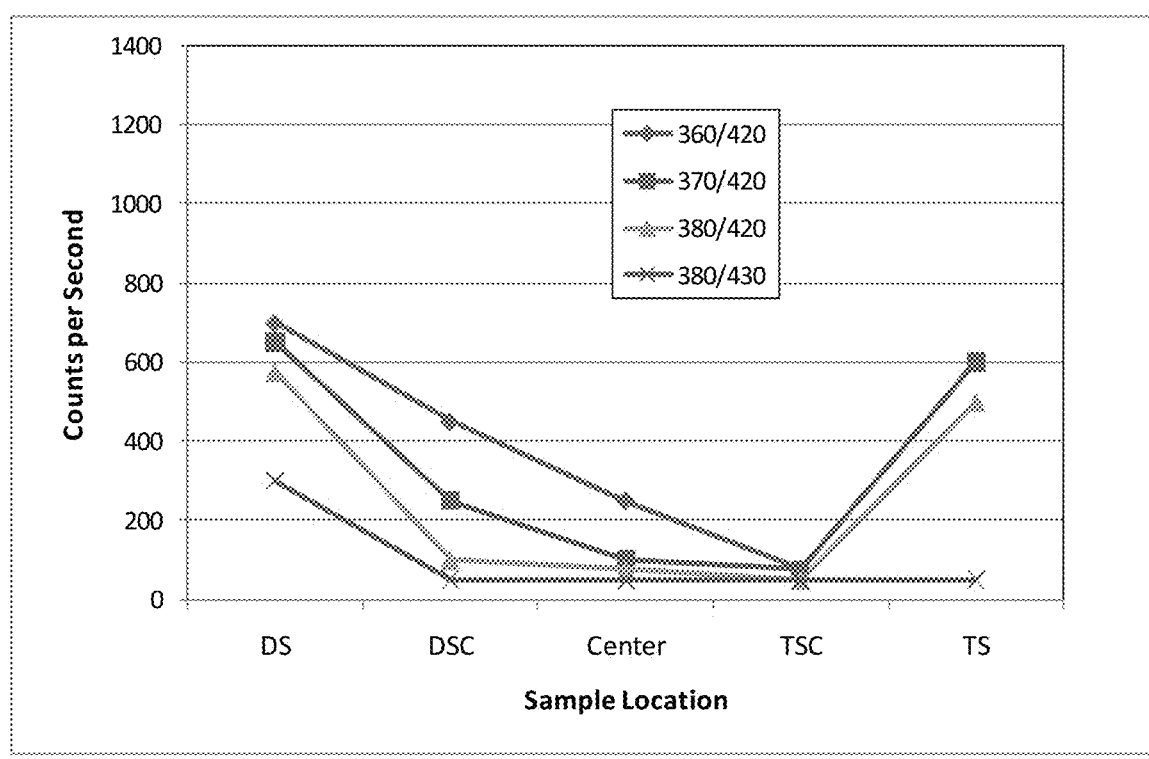
FIG. 10 is a plot showing relative crystallinity values (counts per second) determined by XRD (X-ray diffraction test) measured at different locations of the film of Example 7 after steel lamination at the indicated pre-heat and post-heat temperature settings.

The term "robust performance" relates in particular to commercial metal lamination installations, where, due to process limitations, there is a variability across the web width, in terms of heat history, and, correspondingly, in terms of the final morphology of the laminated film. Such an installation is described in U.S. Pat. No. 9,358,766. A commercial metal lamination line has two key factors affecting such morphology: one is the preheat temperature of the steel sheet just prior to coming in contact with the polyester film at the point of lamination (a pair of nip rolls one or both of which are also heated). For biaxially-oriented PET-based film this temperature is between 320-430° F., preferably 360-430° F. The second is the temperature setting at the post-heat station (for example an infrared (IR)-heated oven), which serves to stabilize the initial bond between the plastic film and the steel created during the lamination step. For biaxially-oriented PET-based film this temperature is between 350-500° F., preferably 420-460° F. As the laminated sheet exits the post-treatment ("post-bake" station, the variability in the morphology of the laminated polyester film is manifested for example by the crystallinity (determined for example by X-ray diffraction—XRD) at different spots across the laminate width; that crystallinity is also affected by both the preheat temperature and the post-heat temperature. The profiles of the relative crystallinity values (counts per second), determined by XRD for a film not containing wax is shown in FIG. 9 and for a film containing wax is shown in FIG. 10. It was surprisingly found, as shown in FIG. 10, that the addition of wax allows the relative crystallinity values (counts per second), determined by XRD (X-ray diffraction test) measured at different locations of the film after steel lamination at a given lamination and post-bake temperature settings is lower than that of the film of FIG. 9 containing no wax. It was also surprisingly found that the film of FIG. 10 had better food release than the film of FIG. 9. When combined with the siloxane and the PET Resin P1 (PET resin comprising alkali metal phosphate and phosphoric acid), the amount of wax required for meat release is lower than that present in a film which uses solely wax for release properties (such as Lumirror™ grade FN8 polyester film from Toray Industries. That film is impregnated with carnauba wax compounded at a level in the range prescribed by U.S. Pat. No. 6,652,979 (0.1-2 wt. %) or U.S. Pat. No. 6,905,774 (0.1-5 wt. %).).

The remaining two layers will be hereafter named layer "B" for the core layer and skin layer "C" for the skin layer lying on the opposite side versus the A skin layer. Thickness distribution ranges between 5-30%, 40-95%, and 0-30% for layers A, B, and C respectively, based on overall film thickness. Typical total film thickness after biaxial stretching is 10-25 microns, preferably 12 microns-23 microns.

The two-layer or three-layer film structure is laminated onto a metal sheet (steel or aluminum) which is then formed into a container. Both sides of the metal sheet may be laminated with plastic film but the films of this invention are intended for lamination on the metal sheet side that is intended to become the inside surface of the container and in such a way that the outer release layer containing the silicone is the food-contact layer (i.e. the layer away from the metal substrate of the can).

Core layer B may include 100 wt % PET resin ("base resin"). If there is no C layer, then layer B may also contain anti-block-containing masterbatches or low-melting-temperature copolyesters, described below in more detail for optional layer C.

Optional skin layer C can be a lower-temperature-melting (vs. crystalline PET) or amorphous polyester copolymer or a blend of PET base resin with a lower melting (or amorphous) polyester copolymer. One example of a lower-melting polyester are resins comprising butylene terephthalate repeat units such as poly(butylene terephthalate) ("PBT") resin and copolymers thereof with other dicarboxylic acids or diols, such as isophthalic acid, naphthalene dicarboxylic acid, azelaic acid, sebacic acid, adipic acid, ethylene glycol, 1,3-propanediol, 1-2 propanediol, neopentyl glycol, 1,4-cyclohexyldimethanol, and the like. A non-exhaustive list of suitable examples of polybutylene terephthalate (PBT) resins can be: Crastin® FG6129, Crastin® FG6130 from Dupont, Celanese 1600, Celanex® 1700 from Ticona, Toraycon™1100M, Toraycon™ 1200M from Toray Industries, etc. Another example of lower melting polyester are resins comprising trimethylene terephthalate repeat units such as poly(trimethylene terephthalate) (PTT) resins and copolymers thereof with other dicarboxylic acids or diols such as isophthalic acid, naphthalene dicarboxylic acid, azelaic acid, sebacic acid, adipic acid, ethylene glycol, 1,4-butanediol, 1-2 propanediol, neopentyl glycol, 1,4-cyclohexyldimethanol, and the like. A non-exhaustive list of suitable examples of polytrimethylene terephthalate (PTT) resins can be: Sorona® (DuPont), Corterra® (Shell), Ecoriex® (SK Chemicals). The purpose of adding the lower melting or amorphous polyester copolymer in that layer is to facilitate easier adhesion to metal during thermal lamination. However the addition of such a copolymer is not necessary for making the metal contact layer heat-sealable, as the temperature of lamination and subsequent oven treatment can be adjusted to a value that makes the metal-contact side tacky enough to bond to the metal. Whereas PET polyester has a melting point peak around 250° C., melting initiation occurs at around 205° C. (400 F), which is consistent with lamination temperature conditions and facilitates initial bonding at the pressure of the lamination nip rolls, which is further strengthened by oven treatment of the laminated structure at around 460° F.

Polyester Resin Composition

The resin in layer A is a polyester resin, "P1", comprising a buffer soluble in ethylene glycol, and containing a substance exhibiting ion dissociation. Such a buffer agent is preferably an alkali metal salt, e.g., salts of phthalic acid, citric acid, carbonic acid, lactic acid, tartaric acid, phosphoric acid, phosphorous acid, hypophosphorous acid; alkali metal salt of polyacrylic acid compound or the like. More particularly, the alkali metal is potassium or sodium, therefore specific alkali metal salt examples such as sodium dihydrogen hydroxycitrate, potassium citrate, potassium hydrogen hydroxycitrate, sodium carbonate, sodium tartrate, potassium tartrate, sodium lactate, sodium carbonate, sodium hydrogen phosphate, potassium hydrogen phosphate, potassium phosphate, sodium dihydrogen phosphate, sodium hypophosphite, sodium hypochlorite, sodium polyacrylate, etc. can be cited.

In the preferred embodiment, P1 is a polyester resin composition comprising an alkali metal phosphate as a first phosphorus compound in an amount of 1.3 mol/ton to 3.0 mol/ton of polyester resin, and phosphoric acid as a second phosphorus compound in an amount of 0.4 to 1.5 times (by mole) that of the alkali metal phosphate. It is preferable for the polyester resin composition that its acid component contains a dicarboxylic acid component in a molar amount of 95% or more. In particular, a terephthalic acid component is preferred in view of the mechanical characteristics. It is also preferable, from the viewpoint of mechanical characteristics and thermal characteristics, that the glycol component contains a straight-chain alkylene glycol having 2 to 4 carbon atoms in an amount of 95% by mole or more.

In particular, ethylene glycol, which has two carbon atoms, is preferred from the point of view of moldability and crystallization of the polyester resin. In addition to the terephthalic acid and ethylene glycol additional polyester raw materials, e.g. diacids such as isophthalic acid, naphthalene dicarboxylic acid or diols such as 1,4-cyclohexyldimethanol, diethylene glycol, 1,3-prolylene glycol, 1,4-butylene glycol, may be present in the polyester composition polymerization mix as copolymerized components at levels up to 5 mole % of the total diacid or diol. When the contents of a copolymerized component exceeds 5% molar, this will cause a decrease in heat resistance due to the decrease of the melting point and will also cause a reduction in the hydrolytic resistance due to the decrease in the polyester degree of crystallization. It is preferable, from the viewpoint of the hydrolytic resistance, that the polyester resin composition contains an alkali metal phosphate in an amount of 1.3 mol/ton to 3.0 mol/ton of polyester resin. It is preferably 1.5 mol/ton to 2.0 moles/ton of polyester resin. When the content of the alkali metal phosphate is less than 1.3 mol/ton of polyester resin, long term hydrolysis resistance may be insufficient. On the other hand, when the alkali metal phosphate is contained in an amount exceeding 3.0 mol/ton of polyester resin, this is likely to cause phase separation (precipitation) of the alkali metal phosphate.

Examples of alkali metal phosphate include sodium dihydrogen phosphate, disodium hydrogen phosphate, trisodium phosphate, potassium dihydrogen phosphate, dipotassium hydrogen phosphate, tripotassium phosphate, lithium dihydrogen phosphate, dilithium hydrogen phosphate, trilithium phosphate.

Preferred examples of alkali metal phosphate are alkali metal dihydrogen phosphates and alkali metal phosphates. Alkali metal phosphates in which an alkali metal is Na or K are preferred from the viewpoint of long-term hydrolysis resistance. Particularly preferred examples of alkali metal phosphate are sodium dihydrogen phosphate and potassium dihydrogen phosphate. It is preferable from the viewpoint of long-term hydrolytic resistance that the phosphoric acid is 0.4 to 1.5 times that of the alkali metal phosphate in a molar ratio. It is preferably from 0.8 to 1.4 times. If it is smaller than 0.4 times, long-term hydrolysis resistance may deteriorate. If it exceeds 1.5 times, a polymerization catalyst is deactivated by excess phosphoric acid; this will result in a delay of the polymerization, as well as increases in the amount of terminal groups COOH, which will contribute to degrading the hydrolytic resistance of the polyester resin.

According to the calculations based on the contents of alkali metal phosphate and phosphoric acid, the polyester resin composition contains an alkali metal element in an amount of 1.3 mol/ton of polyester resin to 9.0 mol/ton of polyester resin and a phosphorus in an amount of 1.8 mol/ton of polyester resin to 7.5 mol/ton of polyester resin.

In view of the type of alkali metal phosphate preferred, the polyester resin composition preferably contains an alkali metal element in an amount of 1.3 mol/ton of polyester resin to 6.0 mol/ton of polyester resin and a phosphorus in an amount of 1.8 mol/ton of polyester resin to 7.5 mol/ton of polyester resin.

From the viewpoint of reducing the amount of terminal groups COOH and inhibiting the formation of foreign bodies, it is preferable that the total content of phosphorus compounds contained in the polyester resin composition of the present composition is from 30 PPM to 150 PPM by weight of the polyester resin composition, in terms of the amount of phosphorus element. It is more preferred that this content is 60 PPM to 150 PPM.

It is preferable that the composition of polyester resin P1 comprises a metal-containing compound ("metal compound") of which the metal element is at least one member selected from the group consisting of Na, Li and K, a metal compound of which the metal element is at least one member selected from the group consisting of Mg, Ca, Mn, and Co, and a metal compound, the metal element is at least one member selected from the group consisting of Sb, Ti and Ge, and the total amount of these metal elements is adjusted to 30 PPM or more and 500 PPM or less based on the entire of the polyester resin composition. By adjusting the total amount of metal elements within this range, the amount of terminal groups COOH can be reduced in the polyester resin to improve its heat resistance. It is more preferred that this content is 40 PPM to 300 PPM. The elements Na, Li and Ka are alkali metal elements. The elements Mg, Ca, Mn, and Co, which are divalent metal elements, are transesterification catalyst and confer electrostatic characteristics such as the resistivity of the polyester resin. Sb, Ti and Ge are metal members having an ability to catalyze the polymerization of the polyester resin and serve as polymerization catalyst.

BOPET Film Process

Preferably the multi-layer PET film is biaxially oriented prior to laminating it to the metal substrate. Typically, a raw material PET resin is supplied in solid form to a melt processing device, preferably a continuous screw extruder. The heating of the melt processor is controlled to maintain the PET resin above its melting point but below polymer degradation temperature. PET molten resin is extruded from an appropriately shaped die to form a thin, flat ribbon of polymer melt. The polymer ribbon is quenched in air and or on a chilled roll to form a solid, self-supporting film. The film is taken up by sets of rollers turning at different rotation speeds that stretch the film in the direction of continuous forward motion, referred to as the machine direction ("MD"). The stretching can be accompanied by heating of the film to establish crystal orientation in the MD. The mono-directionally oriented film is clamped at its opposite edges in and stretched in the transverse machine direction ("TD") laterally perpendicular to the MD in a tenter oven. The tenter oven is heated to temperatures operative to establish crystal orientation in the TD thus forming a biaxially oriented PET film. Preferably biaxially oriented PET film is stretched about 100%-400% in the MD and 100%-600% in the TD. The biaxially oriented film can be heat-set at temperatures preferably between about 300° F. and about 490° F., more preferably about 350° F. to about 460° F.

EXAMPLES

This invention will be better understood with reference to the following Examples, which are intended to illustrate specific embodiments within the overall scope of the invention, but the scope of the invention is not limited to the Examples.

Resin Materials

Resin materials for films mentioned in the examples were as follows:

PET Resin P1 (PET resin comprising alkali metal phosphate and phosphoric acid): Toray F1CCS64 (IV=0.65; Tm=255° C.) supplied by Toray Films Europe.

PET Resin P2 (ordinary film-grade PET resin, not comprising alkali metal phosphate): Toray F21MP (IV=0.65; Tm=255° C.) manufactured by Toray Plastics America.

PET Resin P3: Bottle-grade PET resin 8712A from Invista with an IV of 0.75.

PET Resin P4: PET Resin anti-block masterbatch type F18M, containing 2% silica particles of average size 2 μm (Fuji Silysia 310P) manufactured by Toray Plastics America (IV=0.62; Tm=255° C.).

Amorphous Copolyester Resin CoP1: Eastar® 6763 PETG supplied by Eastman Chemical (based on terephthalic acid reacted with 33:67 molar parts combination of CHDM (1,4-cyclohexyldimethanol)/ethyelneglycol)); IV=0.76.

Slow-crystallizing Copolyester Resin CoP2: IPET F55M Resin (IV=0.69; Tm=205° C.) manufactured by Toray Plastics America based on 19:81 molar (=weight in this case) parts combination of isophthalic/terephthalic acid reacted with ethylene glycol.

Silicone Resin Masterbatch: Dow Corning MB50-010 containing 50% of an ultra-high molecular weight polymerized siloxane ("Silicone Resin") and 50% of a polyester elastomer carrier resin.

Low-melting point polyester resin P5: Polybutylene terephthalate (PBT) resin Crastin® FG6130 from E.I. DuPont De Nemours, having melting point 223° C.

The Carnauba wax component was added in the form of a masterbatch ("Wax MB") containing 2 wt. % wax, available under the trade name W030 from Toray Industries.

General Film Making Procedure

The multi-layer coextruded BOPET film was made using a 1.5 m-wide pilot-line sequential orientation process The coextruded film is cast onto a chill drum using an electrostatic pinner, oriented in the machine direction through a series of heated and differentially sped rolls, followed by transverse direction stretching in a tenter oven.

The multilayer coextruded laminate sheet is coextruded by means of a main extruder for melting and conveying the core blend to the die and by means of one or two sub-extruders for melting and conveying the skin blends to the die. Extrusion through the main extruder takes place at processing temperatures of ca. 270° to 285° C. Extrusion through the sub-extruders takes place at processing temperatures of ca. 270° C. to 280° C. Both the main and the sub polymer melt streams flow through a die to form the laminate coextruded structure and is cast onto a cooling drum whose surface temperature is controlled at about 21° C. to solidify the non-oriented laminate sheet at a casting speed of about 9 mpm. The non-oriented laminate sheet is stretched in the longitudinal direction at about 75° C. to 85° C. at a stretching ratio of about 3 times the original length and the resulting stretched sheet is annealed at about 70° C. to obtain a uniaxially oriented laminate sheet.

The uniaxially oriented laminate sheet is introduced into a tenter at a line speed of ca. 27 mpm and preliminarily heated at 80° C., and stretched in the transverse direction at about 90° C. at a stretching ratio of about 4 times the original width and then heat-set or annealed at about 210° C. to reduce internal stresses due to the orientation and minimize shrinkage and give a relatively thermally stable biaxially oriented sheet.

Film Thermal Lamination Procedure onto Metal Sheet

Tin-free steel (TFS) with a thickness of 0.0075" was preheated to 400 F (except where otherwise indicated). The steel and film were passed through a set of nipped rolls forming the initial bond of film to steel. The film and steel laminate structure were then passed through a secondary heating operation ("post-bake") at 460 F for 20 seconds, then cooled to room temperature.

The film side laminated to steel was the side opposite that of the silicone-comprising side (food contact side; side A in the examples), i.e. the lamination side was side B or C in the examples.

Test Methods

The various properties in the above examples were measured by the following methods:

Intrinsic viscosity (IV) of the film and resin were tested according to ASTM D 4603. This test method is for the IV determination of poly(ethylene terephthalate) (PET) soluble at 0.50% concentration in a 60/40 ratio of phenol/1,1,2,2-tetrachloroethane solution by means of a glass capillary viscometer.

Melting point of copolyester resin is measured using a TA Instruments Differential Scanning Calorimeter model 2920. A 0.007 g resin sample is tested, substantially in accordance to ASTM D3418-03. The preliminary thermal cycle is not used, consistent with Note 6 of the ASTM Standard. The sample is then heated up to 300° C. temperature at a rate of 10° C./minute, while heat flow and temperature data are recorded. The melting point is reported as the temperature at the endothermic peak.

Film crystallinity were measured by X-Ray Diffraction method on a PANalytical X'Pert PRO system with Cu X-Ray source (40 kV, 20 mA) and a Xe gas proportional type detector. The incident X-ray beam is directed at the sample over a spectrum of angles and the intensity of the diffracted beam is measured at each angle as the count of the number of pulses per second. A measure of crystallinity specified as "Counts per Second" (cps) is reported based on the count of the number of pulses at peak intensity of the diffracted beam. The sample was scanned from 18° to 32° to cover both PBT and PET maximum diffraction angles, 2θ=23.38° and 2θ=25.8° for the [100] crystallographic plane (angles of peak intensity). Preferred cps values before lamination are 1500 or higher and after lamination 900 or higher.

Food Release Test:

The food area coverage on the food contact side of the polyester film laminated to steel is measured according to a food release test, referred herein as "Food Release Test." The procedure of the Food Release Test is described below.

Figure 2:
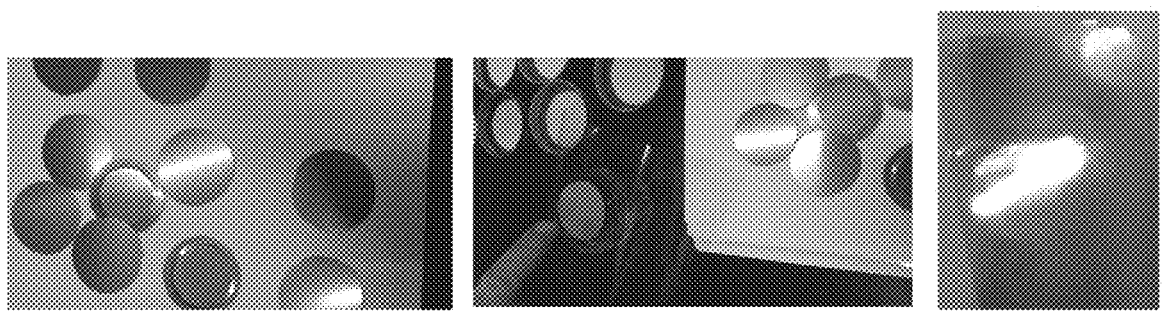
FIG. 2 shows pictures of BOPET laminated metal disks and of a non-laminated BOPET film.
Figure 3:
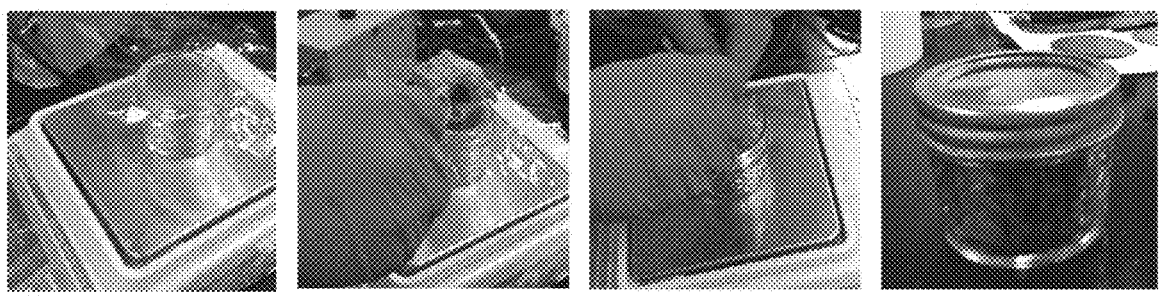
FIG. 3 shows pictures of inserting of the food mix into a jar that is sealed with cap having a BOPET laminated metal disk, where the BOPET film contacts the food mix.

A food mixture of chicken egg/ground beef/flour at a ratio of 3/2/1 was prepared, as follows:

A. Food Release Mix Preparation Steps Shown in FIG. 1
 For 8-10 jar test 1 lb of ground beef was put in the mix container, such as a plastic jar
 The contents of five Grade A large chicken eggs was added into the mix container and mixed manually with a paddle or a metal rod
 8 oz of all-purpose white flour was added slowly while mixing, until the mixing was thorough B. Placing Samples in Glass Test Jars as Shown in FIGS. 2 and 3
 Disks were cutout using shears from the film/metal laminates described above, small enough to fit the bottom of the jar (FIG. 2): In the Examples, 47 mm diameter disks were used to fit inside half-pint wide-mouth Ball® jars
 BOPET film was cut to sheet sizes large enough to fit in the jar and hold the food mix as described in the following steps
 A sheet of film was placed on top of the jar can (meat release side up) and then the metal disk on top of it, with the food contact side facing upward
 A couple of soup spoon-size scoops of the food release mix were placed on top of the sample disk
 The film was wrapped around the food release mix and the disk sitting underneath the food release mix.
 The wrapped food mix (including the sample disk at the bottom) was inserted into the jar and the jar closure was applied.

Figure 4:
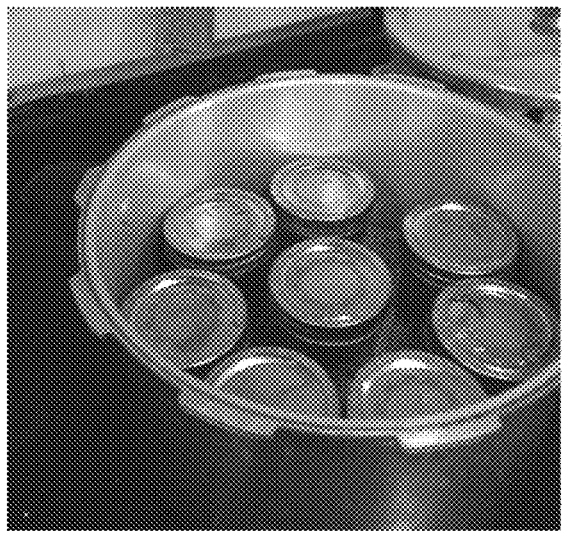
FIG. 4 shows pictures of multiple sealed jars containing the food mix in a pressure cooker, and the pressure cooker on a heated stove.
Figure 4:
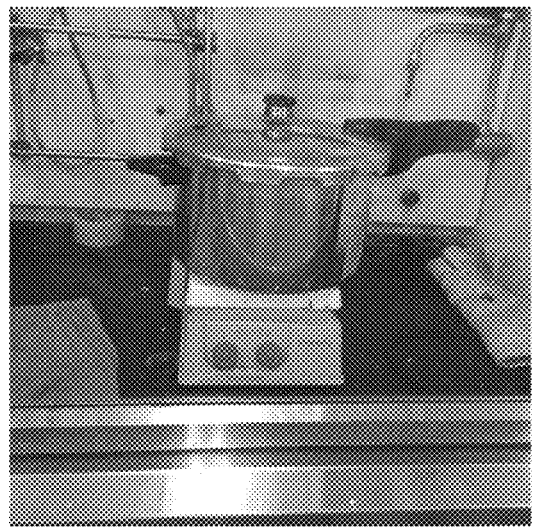
Figure 5:
FIG. 5 shows pictures showing removal of the BOPET laminated metal disk from the cooked food mix.
Figure 5:
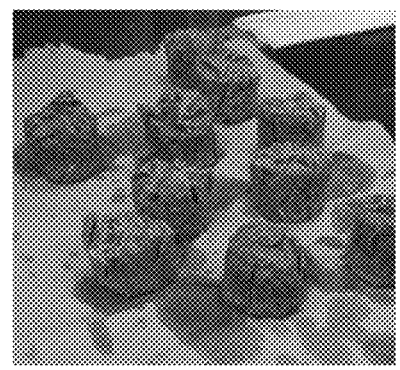
Figure 5:
Figure 6:
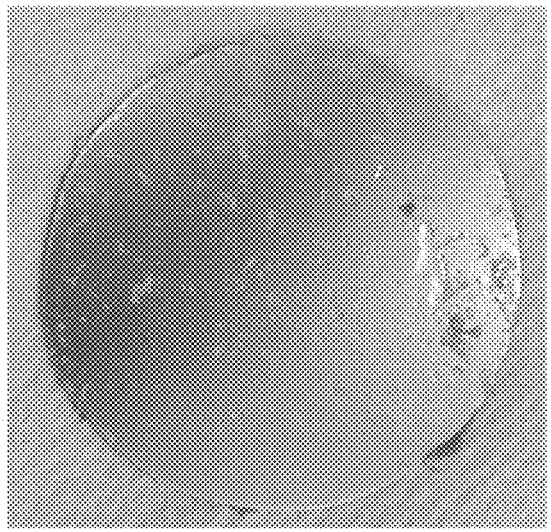
FIG. 6 shows pictures of BOPET laminated metal disks demonstrating good and bad release of the cooked food mix from the BOPET film surface of the BOPET laminated metal disks.
Figure 6:
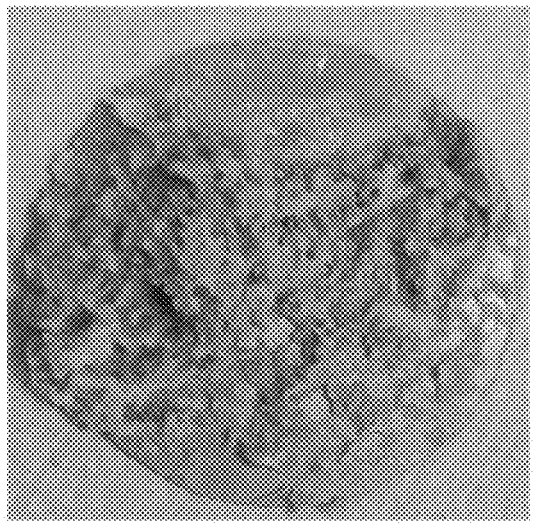

C. Retorting and Testing (FIGS. 4 and 5)
 The "retort" (a pressure cooker as shown in FIG. 4) was filled with water up to 0.5" below the underside of the perforated steam plate
 The test jars were placed on top of the plate and retort (pressure cooker) cover was applied securely.
 The retort was placed on a hot plate set to medium-high and retorted for 90 minutes after the pressure valve started oscillating (inside pressure 14.7 psig, temperature around 260° F.).
 Pressure cooker was removed from heat and allowed to cool until the valve came down, signifying it is safe to open.
 Pressure cooker was opened, jars removed with tongs and were let to rest overnight
 Film was unwrapped from the food mix (the food mix was still attached to the metal disk).
 Disk was peeled away from the food mix in an orthogonal motion and evaluated for release performance. See FIG. 6 for good and bad examples of food release.

"Retort process" means a procedure in which the inside or outside of a metal container with a wall composed of a composite of a metal substrate having a polymer film laminated onto the inside, the outside or both sides of the substrate is treated with live steam or super-heated water for a period of time.

"Live steam" means that steam directly contacts the surface of the container. The steam is usually superheated, i.e., above the boiling point of water. A nominal retort process calls for exposure to steam at temperature of 260° F. for 90 minutes. The temperature and duration of exposure of the retort process can vary to provide an approximately equivalent sterilization and food pasteurization effectiveness. For example, the temperature might be higher for a shorter duration or lower for a longer duration.

Figure 7:
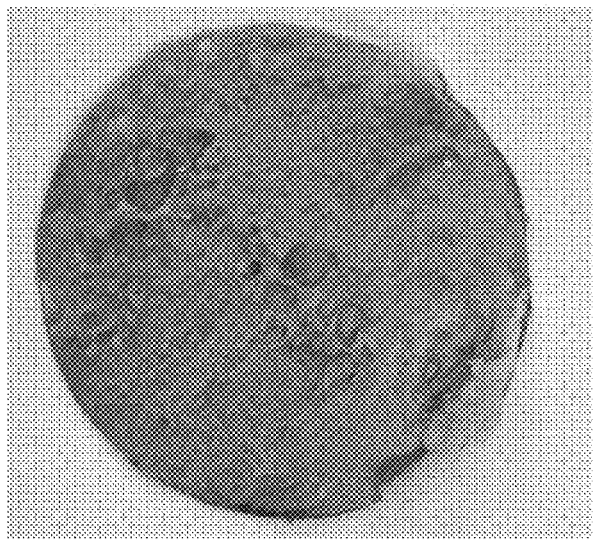
FIG. 7 shows pictures of a BOPET laminated metal disk ("Test Sample") after the food release test with a grid overlaid on the BOPET laminated metal disk to calculate the percentage of food area coverage where the cooked food mix remains stuck to the BOPET film.
Figure 8:
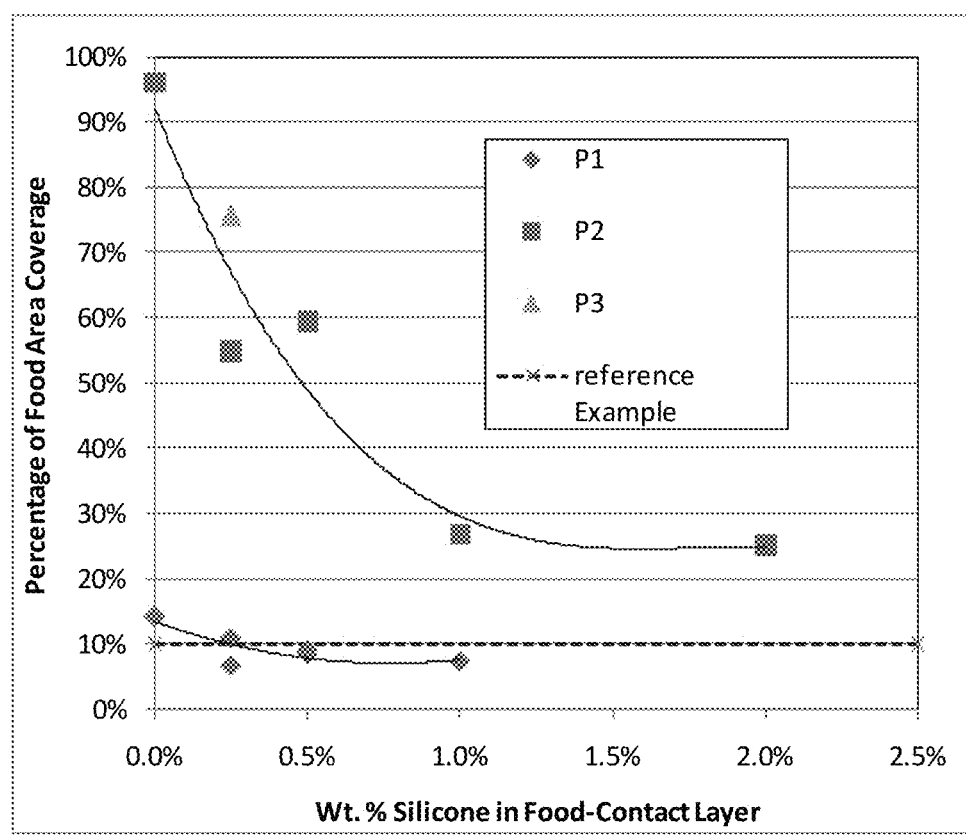
FIG. 8 shows a plot of percentage of food area coverage where the cooked food mix remains stuck to the BOPET film as a function of weight percent of the ultra high molecular weight silicone.

The release performance was rated by producing a photographic image of the test laminated disk after release and superposing a rectangular grid image using Microsoft Paint™ software. The number of grid squares occupied by food remained adhering was then counted and expressed as percentage of the total number of grid squares. The lower the percentage the better the food release performance (FIG. 7).

The acceptance rating, based on percentage, is as follows: (based on U.S. Pat. No. 6,905,774)

Grade A ("Excellent"): 0-5%
Grade B ("Good"): 5-10%
Grade C ("Acceptable"): 10-20%
Grade D ("Poor"): 20-50%
Grade E ("Very Poor"): 50-100%

Food Migration Test

Testing was conducted by a qualified laboratory (named at the time of testing as follows: Covance Laboratories, Madison, Wis.)) under the conditions prescribed by Code of Federal Regulations, Title 21CFR177.1630, conditions (f), (g), (h). The testing consists of exposing the food-contact surface (layer A in this case) under the following specifications for each of the conditions of use, and then determining the levels of chloroform-soluble extractives present in the exposure medium:

Condition (f): Allowed for food excluding alcoholic beverages at emperors not to exclude 250° F.—Extractables Limit 0.5 mg/in$^2$ after 2-hr exposure in n-heptane at 150° F., and distilled water at 250° F.

Condition (g): Allowed for alcoholic beverages not exceeding 50% alcohol-Extractables Limit: 0.5 mg/in$^2$ after 24-hr exposure in 50% ethanol at 120° F.

Condition (h): Allowed for containing foods during baking or oven cooking at temperatures exceeding 250° F.—Extractables Limit: 0.02 mg/in$^2$ after 2-hr exposure in n-heptane at 150° F.

Examples 1 and 1a 3-layer BOPET film structures were produced by melt extrusion from three extruders supplying the resin blends corresponding to layers A, B, and C as shown on Tables 1, 2, and 3 respectively. The silicone masterbatch content in layer A was 0.5%, corresponding to silicone content 0.25 wt. %. The differences between compositions 1 and 1a were with respect to the antiblock masterbatch (P4) content in layer A and with respect to the amorphous copolyester (CoP1) content in layer C (and the resulting differences in the content of the majority resin balance P1 and P2 in layers A and C respectively). The cast film was formed into a biaxially oriented film by stretching 3 times along the machine direction at a temperature of 82° C. and subsequently stretching 4 times along the transverse direction through an oven held at a temperature 85-93° C. in the stretch zone and 204° C. in the anneal zone and collected in roll form by means of a rotating winder at a linear speed of 32 m/min.

The films were subsequently laminated on a sheet of tin-free metal sheet with side C adhering onto the metal sheet surface Film A side was then tested for food release according to the procedure described earlier. The score, expressed as percentage of total area occupied by food remains is listed in Table 4

Examples 2 and 2a

Examples 1 and 1a were repeated with the only major difference being that the silicone masterbatch content in layer A was 1.0%, corresponding to silicone content 0.5 wt. %. using an A/B/C three-layer structure as shown in Tables 1, 2, 3 respectively. The Results of the food release test are listed in Table 4

Example 3

Example 1 was repeated with the only major difference being that the silicone masterbatch content in layer A was 2.0%, corresponding to silicone content 1.0 wt. %. making an A/B/C three-layer structure as shown in Tables 1, 2, 3 respectively. The Results of the food release test are listed in Table 4

Example 4

A 2-layer BOPET film structures was produced by melt extrusion from two extruders supplying the resin blends corresponding to layers A and B as shown in Tables 1, 2, respectively. Layer B contains 15% PBT. The extrusion conditions were the same as those listed in Comparative Example 5. The silicone masterbatch content in layer A was 0.5%, corresponding to silicone content 0.25 wt. %.

Example 5

Example 4 was repeated with the only difference being that the weight ratio of PBT in layer B was increased to 30%.

Example 6

Example 5 was repeated with the only difference being that the weight ratio of PBT in layer B was increased to 45%.

Comparative Example 1

Example 1a was repeated with the only major difference being that no silicone masterbatch was added in layer A, making an A/B/C three-layer structure as shown in Tables 1, 2, 3 respectively. The results of the food release test are listed in Table 4

Comparative Example 2

For this comparative example a twolayer (layers A and B being identical other than the fact that layer B contains internal recycle) commercial biaxial film, available from Toray Plastics America grade "Lumirror™ 48G PA66" was utilized. That film product is based on P2 as base resin and P4 as antiblock masterbatch respectively. The A/B structure is shown in Tables 1 and 2 and the results of the food release test are listed in Table 4

Comparative Example 3

Example 1a was repeated with the only difference that the major polyester resin (base resin) was P2 (standard film-grade PET) and no PET resin comprising alkali metal phosphate and phosphoric acid (such as P1) was used, making an A/B/C three-layer structure as shown in Tables 1, 2, 3 respectively. Like Example 1, this Comparative Example comprised 0.5 wt % of silicone masterbatch. The results of the food release test are listed in Table 4

Comparative Example 4

Example 2a was repeated with the only difference being that the major polyester resin (base resin) ws P2 (standard film-grade PET) and no PET resin comprising alkali metal phosphate and phosphoric acid (such as P1) was used, making an A/B/C three-layer structure as shown in Tables 1, 2, 3 respectively. Like Example 2, this Comparative Example comprised 1.0 wt % of silicone masterbatch in layer A. The results of the food release test are listed in Table 4

Comparative Example 5

A 2-layer BOPET film structure was produced by melt extrusion through two extruders supplying the resin blends corresponding to layers A and B and then formed into a biaxially oriented film by casting on a cooling drum held at 21° C., stretching 3 times along the machine direction at a temperature of 82° C., and subsequently stretching 4 times along the transverse direction through an oven held at a temperature 85-93° C. in the stretch zone and 204° C. in the anneal zone, and collected in roll form by means of a rotating winder at a linear speed of 32 m/min. The final A/B biaxially-oriented two-layer structure is shown in Tables 1 and 2 respectively. Like Example 3, this Comparative Example comprised 2.0 wt % of silicone masterbatch in layer A, corresponding to silicone content 1 wt. % The results of the food release test are listed in Table 4.

Comparative Example 6

Comparative Example 5 was repeated with the only difference being that the silicone masterbatch content in layer A was 4.0 wt %, corresponding to silicone content 2.0 wt. %, making an A/B two-layer structure as shown in Tables 1 and 2 respectively. The results of the food release test are listed in Table 4

Comparative Example 7

Comparative Example 3 was repeated (0.5 wt. % silicone masterbatch in the A layer corresponding to 0.25 wt. % silicone) with the only difference being that the major resin in layer A was P3, making an A/B/C three-layer structure as shown in Tables 1 and 2 respectively. The results of the food release test are listed in Table 4

Reference Example

The reference example is represented by a commercial film currently being considered suitable for internal container liner with food release properties, namely Lumirror™ grade FN8 polyester film from Toray Industries. That film is impregnated with carnauba wax compounded at a level in the range prescribed by U.S. Pat. No. 6,652,979 (0.1-2 wt. %) or U.S. Pat. No. 6,905,774 (0.1-5 wt. %.).

TABLE 1

Blend Composition (in wt %) of Layer A

| Example | P1 | P2 | P3 | P4 | Silicone MB | Wax MB | Layer Thickness, μm |
|---|---|---|---|---|---|---|---|
| C. Ex. 1 | 97% | — | — | 3% | 0% | — | 1.5 |
| Ex. 1 | 94.5% | — | — | 5% | 0.5% | — | 1.5 |
| Ex. 1a | 96.5% | — | — | 3% | 0.5% | — | 1.5 |
| Ex. 2 | 94% | — | — | 5% | 1% | — | 1.5 |
| Ex. 2a | 96% | — | — | 3% | 1% | — | 1.5 |
| Ex. 3 | 93% | — | — | 5% | 2% | — | 1.5 |
| Ex. 4 | 93.9% | — | — | 5.6% | 0.5% | — | 1.5 |
| Ex. 5 | 93.9% | — | — | 5.6% | 0.5% | — | 1.5 |
| Ex. 6 | 93.9% | — | — | 5.6% | 0.5% | — | 1.5 |
| C. Ex. 2 | — | 95% | — | 5% | 0% | — | 1.8 |
| C. Ex. 3 | — | 94.5% | — | 5% | 0.5% | — | 1.5 |
| C. Ex. 4 | — | 94% | — | 5% | 1% | — | 1.5 |
| C. Ex. 5 | — | 95% | — | 3% | 2% | — | 1.8 |
| C. Ex. 6 | — | 93% | — | 3% | 4% | — | 1.8 |
| C. Ex. 7 | — | — | 94.5% | 5% | 0.5% | — | 1.5 |
| C. Ex. 8 | 94.5% | — | — | 5% | 0.5% | — | 1.5 |
| Ex. 7 | 95% | — | — | — | 0.5% | 4.5% | 1.5 |

TABLE 2

Blend Composition (in wt %) of Layer B

| Example | P1 | P2 | P3 | P4 | CoP2 | P5 | Layer Thickness, μm |
|---|---|---|---|---|---|---|---|
| C. Ex. 1 | — | 100% | — | — | — | — | 10.7 |
| Ex. 1 | — | 100% | — | — | — | — | 10.7 |
| Ex. 1a | — | 100% | — | — | — | — | 10.7 |
| Ex. 2 | — | 100% | — | — | — | — | 10.7 |
| Ex. 2a | — | 100% | — | — | — | — | 10.7 |
| Ex. 3 | — | 100% | — | — | — | — | 10.7 |
| Ex. 4 | — | 79.4% | — | 5.6% | — | 15% | 13.5 |
| Ex. 5 | — | 64.4% | — | 5.6% | — | 30% | 13.5 |
| Ex. 6 | — | 49.4% | — | 5.6% | — | 45% | 13.5 |
| C. Ex. 2 | — | 95% | — | 5% | — | — | 10.4 |
| C. Ex. 3 | — | 100% | — | — | — | — | 10.7 |
| C. Ex. 4 | — | 100% | — | — | — | — | 10.7 |
| C. Ex. 5 | — | 92% | — | 3% | 5% | — | 13.5 |
| C. Ex. 6 | — | 92% | — | 3% | 5% | — | 13.5 |
| C. Ex. 7 | — | 100% | — | — | — | — | 10.7 |
| C. Ex. 8 | — | 79.4% | — | 5.6% | — | 15% | 10.4 |
| Ex. 7 | — | 60% | — | 5% | — | 35% | 10.7 |

TABLE 3

Blend Composition (in wt %) of Layer C (examples not shown have only A and B layers)

| Example | P1 | P2 | P3 | P4 | CoP1 | Layer Thickness, μm |
|---|---|---|---|---|---|---|
| C. Ex. 1 | — | 67% | — | 3% | 30% | 1.5 |
| Ex. 1 | — | 85% | — | — | 15% | 1.5 |
| Ex. 1a | — | 67% | — | 3% | 30% | 1.5 |
| Ex. 2 | — | 85% | — | — | 15% | 1.5 |
| Ex. 2a | — | 67% | — | 3% | 30% | 1.5 |
| Ex. 3 | — | 85% | — | — | 15% | 1.5 |
| C. Ex. 3 | — | 85% | — | — | 15% | 1.5 |
| C. Ex. 4 | — | 85% | — | — | 15% | 1.5 |
| C. Ex. 7 | — | 85% | — | — | 15% | 1.5 |

TABLE 4

Steel Lamination Temperature and Results of Food Release Test

| Example | Major PET Resin in Food-Contact Outer release layer (layer A) | % Silicone Resin in Food-Contact Outer release layer | Metal Lamination Conditions Lam. Temp. ° F. | Metal Lamination Conditions Post-Bake Temp. ° F. | Food Release Test % Area with unreleased food remains |
|---|---|---|---|---|---|
| C. Ex. 1 | P1 | 0.00% | 400 | 460 | 14% |
| Ex. 1 | P1 | 0.25% | 400 | 460 | 11% |
| Ex. 1a | P1 | 0.25% | 400 | 460 | 7% |
| Ex. 2 | P1 | 0.50% | 400 | 460 | 9% |
| Ex. 2a | P1 | 0.50% | 400 | 460 | 8% |
| Ex. 3 | P1 | 1.00% | 400 | 460 | 7% |
| Ex. 4 | P1 | 0.50% | 370 | 440 | 2% |
| Ex. 5 | P1 | 0.50% | 370 | 440 | 1% |
| Ex. 6 | P1 | 0.50% | 370 | 440 | 2% |
| C. Ex. 2 | P2 | 0.00% | 400 | 460 | 96% |
| C. Ex. 3 | P2 | 0.25% | 400 | 460 | 55% |
| C. Ex. 4 | P2 | 0.50% | 400 | 460 | 59% |
| C. Ex. 5 | P2 | 1.00% | 400 | 460 | 27% |
| C. Ex. 6 | P2 | 2.00% | 400 | 460 | 25% |
| C. Ex. 7 | P3 | 0.25% | 400 | 460 | 76% |
| Ref. Ex. | n/a | None; Carnauba wax instead | 400 | 460 | 10% |

These results indicate that films comprising polyester P1 (an alkali metal phosphate/phosphoric acid comprising polyester) in the food release layer perform much better versus comparative compositions containing the same silicone level but standard (i.e. not comprising alkali metal phosphate/phosphoric acid) polyester in the food release layer.

For amore in-depth analysis, FIG. 2 plots those results versus silicone content in the A layer in the following way: One data series groups the data (C. Ex. 1 and Examples 1, 1a, 2, 2a, and 3) corresponding to films comprising resin P1 as the major PET resin in layer A; another data series groups the data (C. Ex. 2, 4, 5, 6) comprising resin P2 as a major resin in layer A. A single data point plots the data for the film of Comparative Example 7 (comprising resin P3 and 0.25% silicone). It is evident that:

(1) The trend line for series P1 lies much lower than the trend line for series P2, suggesting that there is improvement by going from standard resin to the resin with improved hydrolytic stability of the invention, accomplished by incorporating alkali metal phosphate/phosphoric acid in the catalyst/additive package.

(2) The single data point corresponding to Example 7, i.e. for a different major resin with hydrolytic stability (accomplished by solid-stating to higher IV), i.e. resin P3, falls generally within the trend line for series P2, i.e. this resin does not show improvement vs. standard resin.

(3) Additional improvement in food release performance is noted for both series by incorporating siloxane-based ultra-high molecular weight silicone; however a plateau is reached after about 1 wt. % silicone incorporation.

(4) In the case of series P1 this plateau lies below the benchmark set by the commercial BOPET film of the reference example (film type FN8) once the silicone content goes above roughly 0.1 wt. %.

(5) On the other hand, series P2 plateaus out significantly above the benchmark line set by FN8, indicating that it will not be capable to reach the benchmark value at any silicone addition level.

Besides the plateau, another factor that sets the upper silicone level in the food contact layer, from a practical standpoint, is that silicone migration into the food reached levels above those allowed for passing certain sections of FDA regulation 21 CFR 177.1630, as Table 3 indicates:

The results indicate that silicone levels 2 wt. % and above in the food contact layer prevent the film for passing condition (h), which is the most critical for use as container liner for containers subjected to food sterilization processes that typical exceed 250° F.

The lower temperatures required for successful lamination and post-treatment in the case of the examples comprising PBT in the layer that comes in contact with metal during lamination (layer B in those cases) illustrate the effectiveness of using PBT as a blend ingredient (representing the category of polyester resin having a melting point of least 20° C. below that of the polyester resin P2.

In previous examples the laminated disk sample was taken from a random position on the metal-coated web. In the Examples that follow the effect of position was investigated, both with respect to crystallinity and food release: these Examples help to illustrate the benefit from incorporating wax in improving mitigation of the effects of crystallinity.

Comparative Example 8. (This is a Comparative Example {no wax} for the wax addition Example 7 that follows). Two-layer biaxially oriented polyester film, having layer composition as shown in Tables 1 and 2 was produced on a film production line consisting of a main extruder and a subextruder, casting drum, machine-direction stretching and transverse direction stretching (stenter oven). Stretch ratios were 4.8 in the MD direction and 3.7 in the TD direction. Maximum stretch temperatures were 121° C. in the ND and 104° C. in the TD. Following TD orientation, there was a 5% relaxation section at 233° C. Final line speed was 288 m/min. The final film product was subsequently laminated on a sheet of tin-free metal sheet on the B-layer side under the following conditions: lamination temperature 370-380° F. (188-193° C.); post bake 430-440° F. (2221-227° C.). Food release was tested according to the procedure described earlier at six different locations across the laminate width, depending on the position in the lamination machine: drive side (DS), midde distance between drive side and center ("DSC"), two points at the center on either side of the true center, i.e. center left ("C-L") and center-right ("C-R"), midde distance between tending side and center ("TSC"), and tending side ("TS"). The score, expressed as percentage of total area occupied by food remains is listed in Table 4.

TABLE 3

Results of Migration Test

| Example | Major PET Resin in Food-Contact Outer release layer (layer A) | wt % Silicone Resin in Food-Contact Outer release layer | 21 CFR 177.1630 Methanol Extractables (mg/in$^2$)after Exposure in: | | | 21CFR 177.1630 Conditions Passed: |
|---|---|---|---|---|---|---|
| | | | Ethanol | Heptane | Water | |
| Ex. 1 | P1 | 0.25% | n/a | <0.01 | n/a | (f), (g), (h) |
| Ex. 2 | P1 | 0.50% | n/a | <0.01 | n/a | (f), (g) |
| Ex. 3 | P1 | 1.00% | n/a | <0.01 | n/a | (f), (g) |
| C. Ex. 6 | P2 | 2.00% | 0.05 | 0.15 | 0.05 | (f), (g) |

Additional lamination were conducted at different laminations and post-bake temperature conditions in order to investigate the effect on crystallinity remaining on the film after the steel-lamination process. The results are plotted in FIG. 9.

Example 7: Comp. Example 8 was repeated with the exception that 4.5 wt. % wax masterbatch (resulting in 0.9 wt. % wax) was added in layer A, as shown on Table 1. The PBT level (resin "P5") in layer B was increased to 35 wt % for reasons unrelated with the scope of this invention and should not affect the release results. Process changes vs. Example 7 were a lower MD ratio (4.5) and small adjustments in MD and TD max. temperatures (116° C. and 123° C. respectively); also TD relaxation temperature was 216° C. The final film product was subsequently laminated on a sheet of tin-free metal sheet on the B-layer side at the following conditions: lamination temperature 370-380 (188-193° C.) post bake 430-440° F. (2221-227° C.). Food release was tested according to the procedure described earlier at five different locations across the laminate width, depending on the position in the lamination machine: drive side (DS), midde distance between drive side and center ("DSC"), center, midde distance between tending side and center ("TSC"), and tending side ("TS"). The score, expressed as percentage of total area occupied by food remains is listed in Table 4.

Additional laminations were conducted at different lamination and post-bake temperature conditions in order to investigate the effect on crystallinity remaining on the film after the steel-lamination process. The results are plotted in FIG. 10.

TABLE 4

Results of food release testing at different locations across the lamination width for Example 7 and Comp. Example 8.

| | Skin Layer Ingredients (Wt %) | | | Food Release Test (% coverage) | | | | | | |
|---|---|---|---|---|---|---|---|---|---|---|
| | | Silicone | Wax | | | | | | | |
| Example | P1 | MB | MB | DS | DSC | Center | TSC | TS | DS | Avg. |
| C. 8 | 94.5% | 0.5% | — | 26% | 3% | Left 40% | Right 86% | 34% | 9% | 33% |
| 7 | 94.5% | 0.5% | 4.5% | 6% | 3% | 7% | | 29% | 4% | 10% |

The results of the food release tests on Example 7 and Comparative Example 8, along with the crystallinity testing support the fact that the addition of wax, whereas not improving crystallization, it helps nevertheless to mitigate the effect of loss of crystallinity on food release properties. This is evident, for example, by the food release score around the center (where crystallinity almost vanishes in both Examples) which is much better for the wax-containing sample (Example 7) vs. the control (Comp. Example 8). Overall, these Examples demonstrate that wax addition to the original design (food-contact skin A comprising a polyester using an alkali metal phosphate in the catalyst package and a silicone), which may fall short under certain laminating circumstances, adds robustness to the meat release properties.

All US patents and publications cited in the present application are incorporated herein in their entirety by reference.

What is claimed is:

1. A polyester film comprising an outer release layer (Layer A) and a core layer (Layer B);
the outer release layer comprising: (a) about 93 wt. % to 99.9 wt. % of a polyethylene terephthalate resin P1, the polyethylene terephthalate resin P1 comprising (i) an alkali metal phosphate in an amount of 1.3 mol/ton of the polyester resin P1 to 3.0 mol/ton of the polyester resin P1, and (ii) phosphoric acid in an amount of from 0.4 to 1.5 times by mole that of the alkali metal phosphate, (b) 0.1-2 wt. % of a silicone resin comprising a polydimethylsiloxane resin, and (c) 0.1-3 wt. % silica; and
the core layer comprising a polyester resin P2 and about 15 wt % to about 45 wt % of polybutylene terephthalate (PBT);
wherein the polyester film is free of Bisphenol A, and wherein weight percentages of said (a), said (b), and any optional one or more additional ingredients in the outer release layer total 100 wt. %, and
wherein the outer release layer is free of wax and has a food area coverage of about 5% or less as measured according to Food Release Test;
wherein the silicone resin has a kinematic viscosity ranging from 10-5×10⁶ centistokes at room temperature.

2. The polyester film of claim 1, wherein the core layer comprises about 30 wt % to about 45 wt % of polybutylene terephthalate.

3. The polyester film of claim 1, further comprising a heat-sealable layer (Layer C) comprising (a2) 0.1 to less than 100 wt. % of the polyester resin P2, wherein the polyester resin P2 is crystallizable and different from the polyester resin P1, (b2) 0.1 to less than 100 wt. % an amorphous copolyester resin or a polyester resin having a melting point of least 20° C. below that of the polyester resin P2, and (c2) 0.1-15 wt. % of an antiblock comprising organic or inorganic particles; and
wherein the outer release layer, the core layer and the heat-sealable layer are in this order.

4. The polyester film of claim 3, wherein the polyester resin P2 comprises an aromatic polyester.

5. The polyester film of claim 3, wherein the polyester resin P2 comprises at least 50 wt. % ethylene terephthalate as a constituent component of the polyester resin P2.

6. The polyester film of claim 3, where the polyester resin having a melting point of least 20° C. below that of the polyester resin P2 comprises butylene terephthalate repeat units.

7. A laminated metal sheet comprising the polyester film of claim 3.

8. A laminated metal sheet comprising the polyester film of claim 1.

* * * * *